United States Patent [19]

Leistner et al.

[11] Patent Number: 5,560,099

[45] Date of Patent: Oct. 1, 1996

[54] TEE-NUT SETTING AND FORMING MACHINE

[75] Inventors: Walter H. Leistner; Volkmar W. Leistner, both of Toronto, Canada

[73] Assignee: Sigma Tool & Machine, Scarborough, Canada

[21] Appl. No.: 277,584

[22] Filed: Jul. 20, 1994

Related U.S. Application Data

[63] Continuation-in-part of Ser. No. 128,148, Sep. 29, 1993, abandoned.

[51] Int. Cl.$^6$ ................................................. B23P 19/06
[52] U.S. Cl. ............................ 29/798; 29/432.2; 29/512
[58] Field of Search ........................... 29/243.5, 243.518, 29/243.53, 432, 432.1, 432.2, 509, 512, 798; 227/107, 134, 146, 149; 411/176, 179

[56] References Cited

U.S. PATENT DOCUMENTS

| | | |
|---|---|---|
| 2,120,711 | 6/1938 | Phillips ........................................ 29/432 |
| 2,217,026 | 10/1940 | Nickerson ................................... 29/432 |
| 3,208,135 | 9/1928 | Newbold ..................................... 29/432 |
| 3,460,217 | 8/1969 | Leistner . | 
| 3,480,061 | 11/1969 | Leistner . |
| 3,938,239 | 2/1976 | Lauth .......................................... 29/512 |
| 4,208,776 | 6/1980 | Schleicher ............................ 29/243.5 X |
| 4,312,122 | 1/1982 | Gunter ................................. 29/432.2 X |
| 4,610,072 | 9/1986 | Muller ........................................ 29/512 |
| 4,821,940 | 4/1989 | Rotherham ................................ 227/107 |
| 4,825,527 | 5/1989 | Ladouceur ................................. 29/512 |
| 5,012,573 | 5/1991 | Ito ............................................... 29/798 |
| 5,072,518 | 12/1991 | Scott ........................................... 29/798 |
| 5,237,733 | 8/1993 | Ladouceur et al. ................... 29/512 X |

FOREIGN PATENT DOCUMENTS 804216  11/1958  United Kingdom ..................... 29/512

OTHER PUBLICATIONS

Stafast Products Inc. leaflet "Automatic Feed T-Nut Insertion Machine", No Date, p. 3, Models A01/A02/A03.

*Primary Examiner*—Peter Vo

[57] ABSTRACT

A machine for setting and forming a Tee-nut, of the type having a threaded sleeve and an open lower end on the sleeve, in a workpiece, and having a cylindrical body having an upper opening and a stop, a pin member slidably received within the body and having a top end die portion defining a forming surface, a first resilient device for urging the pin member in an upper normal position, and a second resilient device disposed concentrically around the pin member.

12 Claims, 6 Drawing Sheets

TEE-NUT SETTING AND FORMING MACHINE

FIELD OF THE INVENTION

The invention relates to Tee-nut setting machines, of the type used for setting Tee-nuts in a wooden workpiece and in particular to such a machine which both sets and forms the Tee-nut in a single operation.

This application is a Continuation in Part of U.S. application Ser. No. 08/128,148, Title: Tee-Nut Setting and Forming Machine, Inventors: Walter H. Leistner and Volkmar W. Leistner, filed: Aug.29,1993, now abandoned.

BACKGROUND OF THE INVENTION

Tee-nut setting machines are known in prior art. These machines are designed to set a Tee-nut or the like, of the type having a flange head, a threaded sleeve and an open lower end on the sleeve, in a hole in a workpiece. The Tee-nut is set in a hole in the workpiece and is secured to the workpiece by spikes formed integrally with the Tee-nut. One major drawback of these machines is that the setting of the Tee-nut is not completely secure, and they can become displaced in subsequent use.

In one machine, the lower open end of the Tee-nut is deformed by splitting it into two or more portions and these portions are bent outwardly to hold the lower end of the nut secure. However, this leads to damages of the internal threading of the Tee-nut. Accordingly, special Tee-nuts were made in which the lower end was formed with an enlarged counter bore without threading. This counter bore could then be split open, without damaging the thread. This was difficult to regulate, and the Tee-nut was often split at its lower end, before it was fully inserted. Such special Tee-nuts were also costly to manufacture.

BRIEF SUMMARY OF THE INVENTION

According to an embodiment of the present invention, there is provided a machine for setting and forming a Tee-nut or the like of the type having a threaded sleeve and an open lower end on the sleeve in a hole in a workpiece having means for supporting the workpiece, means for supplying and setting the Tee-nut in the hole, and piston means for axially forcing the Tee-nut into the hole in the workpiece, and further comprising a body defining a chamber having an upper opening and a base defining a stop, a pin member slidably mounted within the cylindrical chamber and having a generally conical top end portion defining a conical surface, a first resilient means supported by the body for urging said pin member into an upper normal position at a distance above and remote from the stop, a flange portion on said body around the open end of the chamber, buffer means supported on the flange portion concentrically around the pin member, for supporting the workpiece, whereby when the piston means axially forces the Tee-nut into the workpiece from one side of the hole in one single stroke, the resilient means will be depressed until the pin member reaches chamber stop, after which the pin member will force against the open lower end of the Tee-nut, thereby flaring the open lower end of the Tee-nut radially outwards over an annular hole surface of the workpiece.

A further feature of the invention provides second support means provided at the upper end of a slidable member, a spring for urging the slidable member into an upper position above and remote from said body and means for adjusting the distance between the slidable member and the body.

According to another embodiment of the present invention, the second support means takes the form of an annular ring made from resiliently compressible material having a predetermined hardness.

A further feature of the invention provides buffer means in the form of a plurality of separate buffers, and preferably at least some of the separate buffers will have predetermined heights, different from one another whereby to accommodate workpieces of varying thicknesses.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF A SPECIFIC EMBODIMENT

Figure 1:
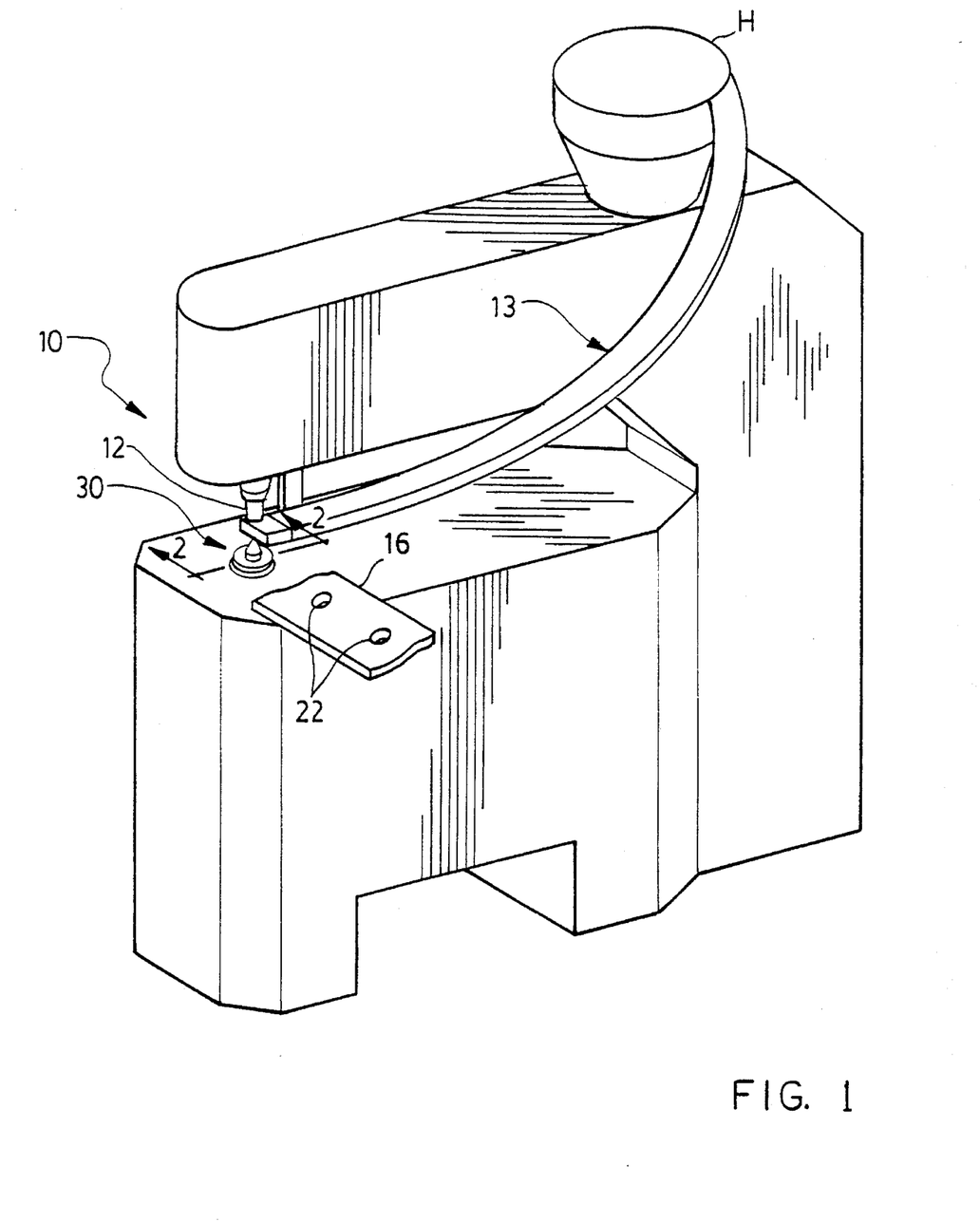
FIG. 1 is a general perspective of a Tee-nut setting and forming machine illustrating one embodiment of the invention.

FIG. 1 is a general illustration of a machine 10 designed for use in cooperation with other necessary machines to perform a series of operations on workpieces. Such series of operations include forming a hole in the workpiece, supplying and setting a Tee-nut in the workpiece, and forming the Tee-nut in the workpiece.

The operation of forming a hole in a workpiece can be performed separately by any conventional drilling machines, or it can be performed in synchronism on the workpiece together with other operations.

For the sake of simplicity, it is assumed that the workpiece 16 comes with a hole or holes 22 already formed on it. The workpiece will then be positioned and supported on the machine so that it is in alignment with a machine-driven piston 12 which is employed to punch a Tee-nut into a hole of the workpiece. A Tee-nut feed mechanism is illustrated generally as 13, supplying loose Tee-nuts from a hopper H.

The operation of supplying Tee-nuts to the machine 10 can be performed by any suitable feed mechanism such as that described in U.S. Pat. No. 3,460,217. The present invention is intended to apply to Tee-nut machines of all types, where it is necessary to facilitate the insertion and fastening of any Tee-nut fastening element into an opening in a workpiece.

Other Tee-nut setting machines are known in which the Tee-nuts are formed into a strip, and are fed to the insertion mechanism, where the end-most nut is separated from the strip, for insertion.

Figures 4, 5, 6:
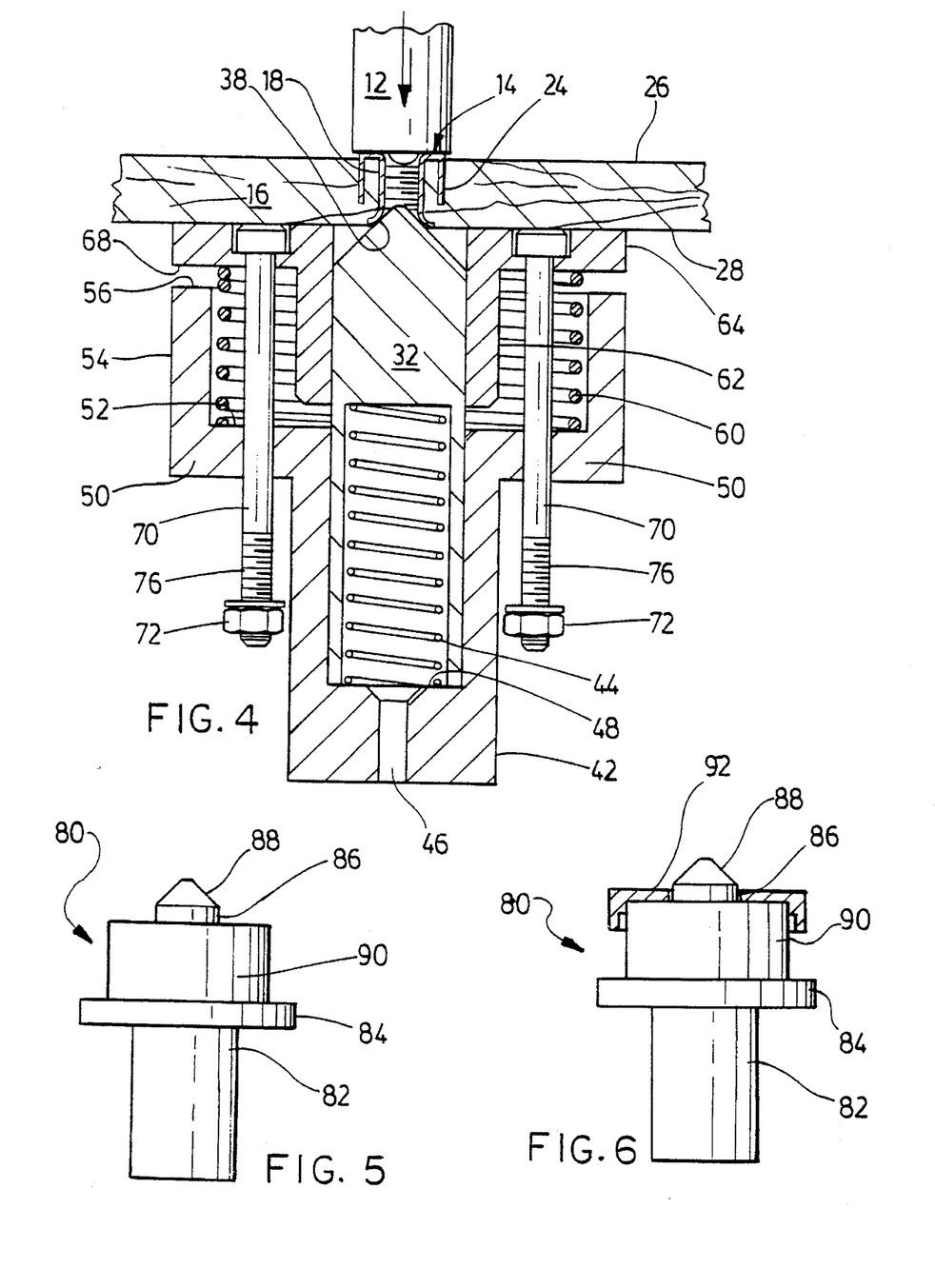
FIG. 4 is a fragmentary sectional view, similar to FIGS. 2 and 3, showing the Tee-nut setting and forming device with a Tee-nut in a finished "set and formed" position.
FIG. 5 is a side elevation of a second embodiment of the Tee-nut setting and forming device illustrating the present invention.
FIG. 6 is a view similar to FIG. 5 showing the Tee-nut setting and forming device with a protective cover.

In this embodiment a Tee-Nut 14 is transferred by mechanism 13 from a supply source or hopper H to a location above the workpiece 16. The Tee-nut 14 has a flange head 15 and a threaded sleeve portion 18 and an open lower end portion 20. The Tee-nut 14 has four downwardly directed prongs 24—24 (FIG. 2) which are provided integrally with the flange head of the Tee-nut 14. The free end portions of these prongs 24—24 are intended to pierce into the upper surface 26 of the workpiece 16 in the "set" position, as indicated in FIG. 4.

The workpiece 16 may be manually loaded onto the machine 10 and, in some cases may be supported thereon by any suitable device, such as guide rails or clamps (not shown), or may be simply be hand held (in most cases) so that the hole 22 of the workpiece 16 is in alignment with the Tee-nut 14 and the piston 12.

The workpiece 16 is positioned such that a hole 22 is seated on the Tee-nut forming device, generally designated by reference numeral 30.

The Tee-nut forming device 30, in accordance with the illustrated embodiment of the present invention, comprises a vertically disposed pin member 32 having a conical top end die portion 34 which defines a forming surface, and a blind hole 36 at the bottom. The axis of the pin member is in alignment with that of the Tee-nut 14 and the piston 12.

The conical top end portion 34 is tapered upwardly such that the diameter of the section of at least an upper tip portion of the conical end 34 is less than the diameter of the hole 22 in the workpiece 16 and of the sleeve 18 of the Tee-nut. This tip portion is adapted to be disposed within the lower end of the hole 22 in such a manner that the conical surface is in abutment with an annular hole periphery 38, the purpose of such abutment being described later in detail.

The lower portion of the pin member 32 is slidably mounted within a cylindrical chamber 40 defined by a cylindrical body 42 having an upper open end and a closed base 48. The base 48 acts as a stop for limiting the downward movement of the pin member 32.

Figures 2, 7:
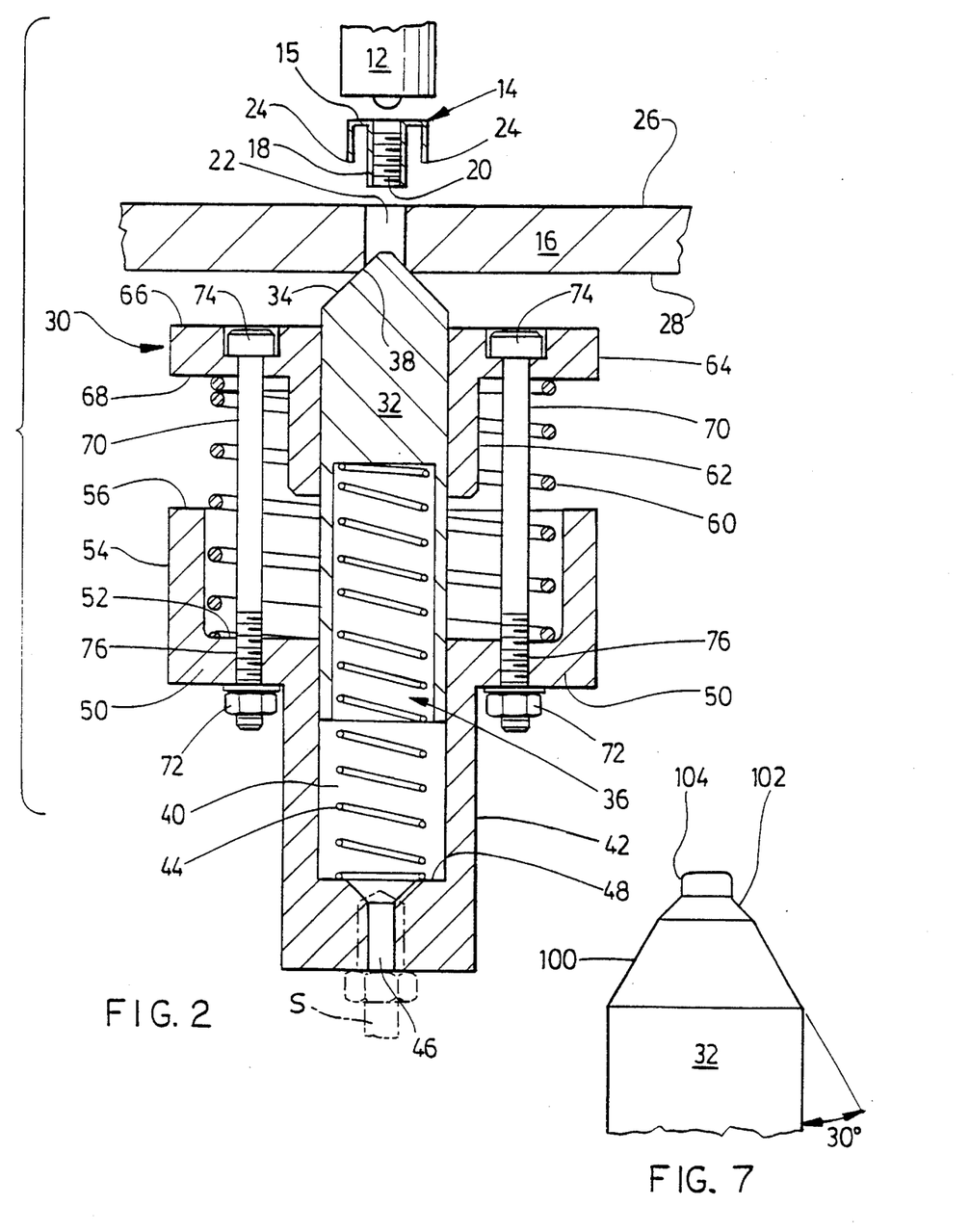
FIG. 2 is a fragmentary sectional view along line 2—2 in FIG. 1 showing an embodiment of a Tee-nut setting and forming device illustrating the present invention with the Tee-nut in a first "ready" position.
FIG. 7 is an enlarged detailed side view of the top end portion of a pin member of the Tee-nut setting and forming device.

A pin movement spring 44 is housed within the blind hole 36 of the pin member 32 and is adapted to bias the pin member 32 in an upper normal position, as indicated in FIG. 2. When the workpiece 16 is pressed downwards towards the Tee-nut setting and forming device 30, the pin member 32 partially slides down within the cylindrical body 42 into a slightly lower position, as indicated in FIG. 3, in which the lower end of the pin member 32 is at a distance x from the base 48 of the body 42 (as described below).

It is understood that the outer diameter of the pin member 32 is slightly less than the diameter of the chamber 40 so that the pin member 32 can be smoothly slidable within the body 42 in an axial direction.

The body 42 has an aperture 46 passing through the bottom wall thereof to permit flow of air, from an air supply S for clearing chips of workpiece 16.

An annular flange 50, defining an annual upper surface 52, is integrally provided at the upper end of the body 42. Extending upwardly from the outer periphery of the annular flange 50 is an annular skirt portion 54 having a top wall 56.

Figure 3A:
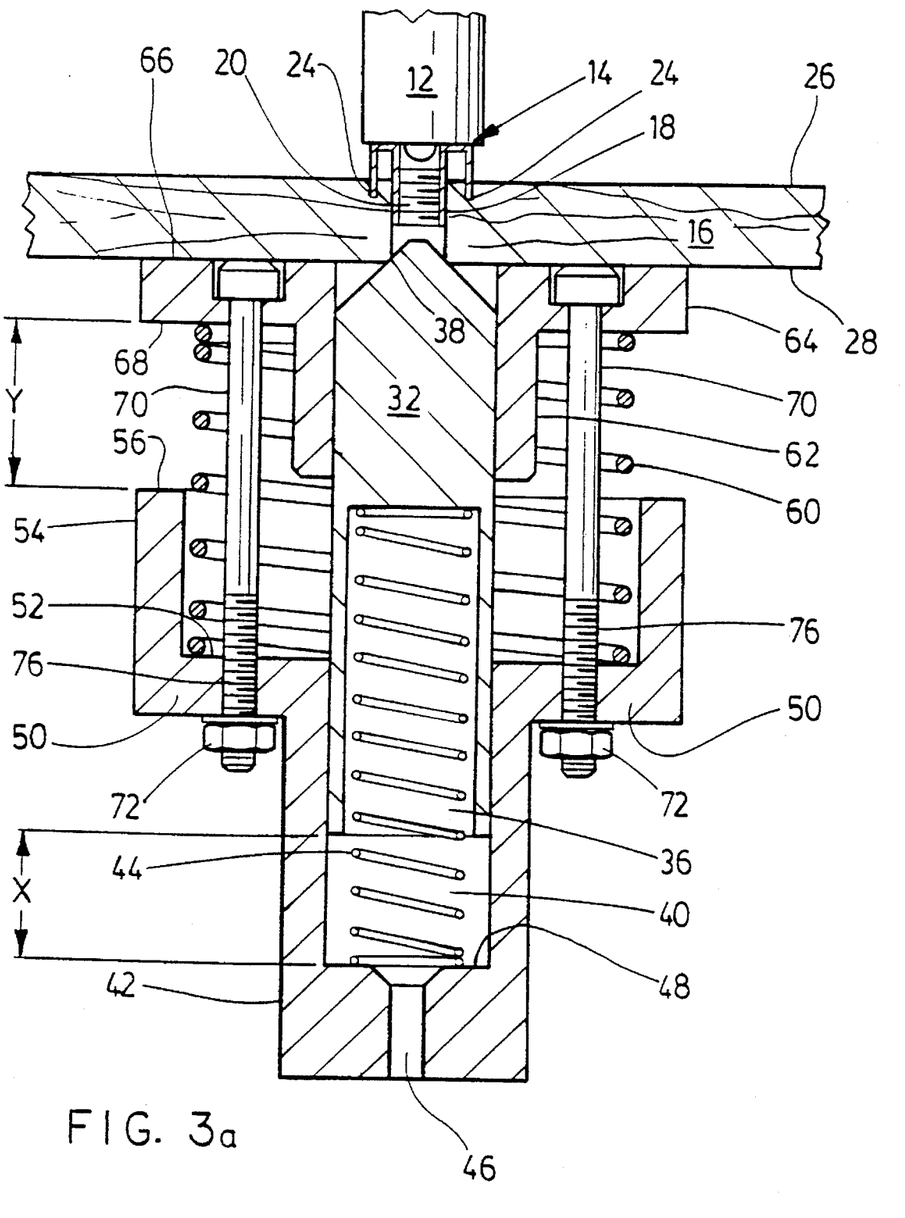
FIG. 3A is a fragmentary sectional view, similar to FIG. 2, showing the Tee-nut setting and forming device with the Tee-nut in a second "partially set" position.
Figure 3B:
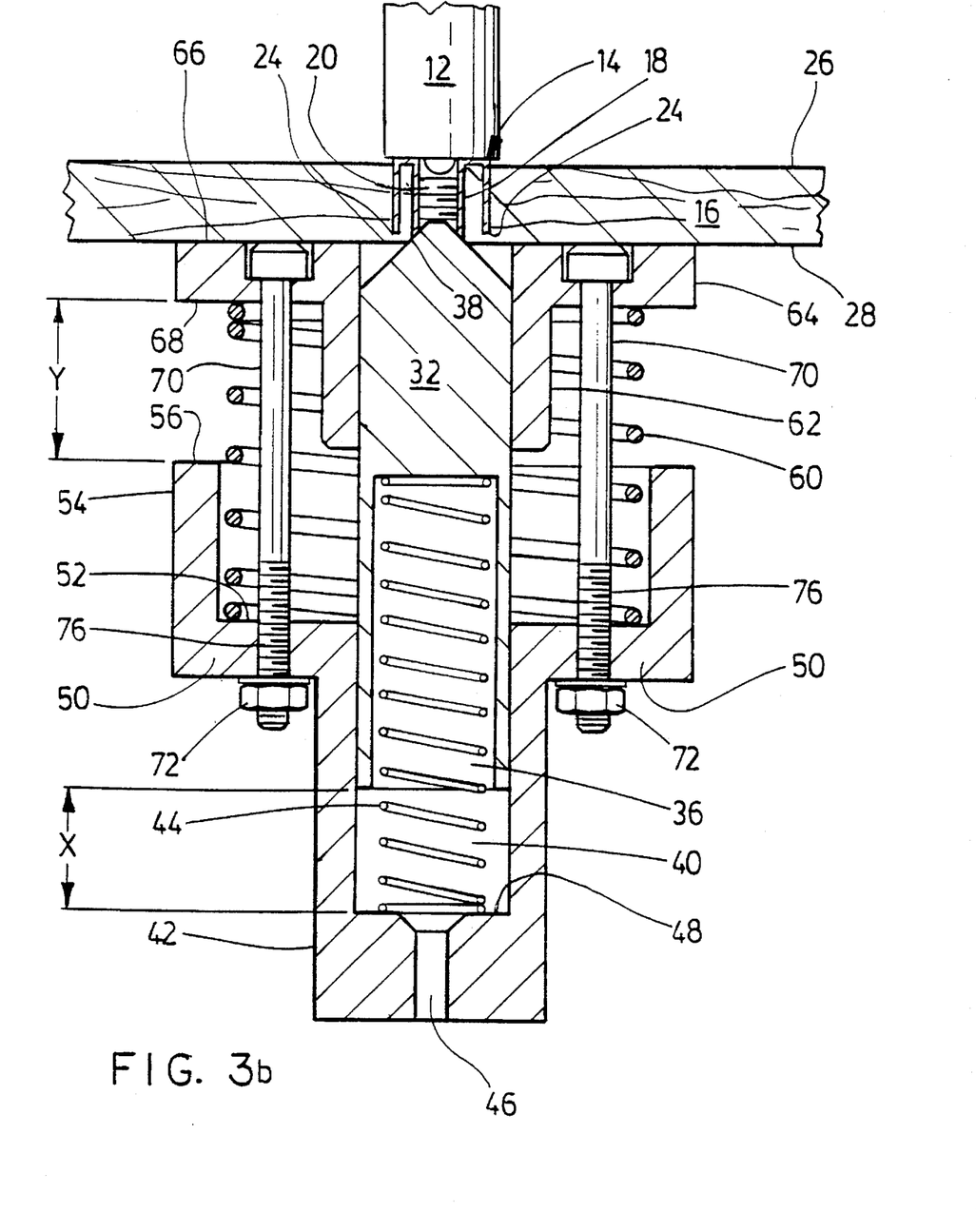
FIG. 3B corresponds to FIG. 3A but shows the Tee-nut in its fully "set" position, but before "forming"

A spring 60 is disposed on the upper surface 52 of the annular flange 50 and is held in position by the annular skirt portion 54. The spring 60 is substantially stronger than spring 44. A slidable sleeve member 62 fits within spring 60, and skirt 54. Spring 60 is adapted to bias a sleeve member 62 into an upper normal position, as indicated in FIGS. 2, 3A and 3B.

The sleeve member 62 is integrally provided with an annular flange portion 64 having a top bearing wall 66 and a bottom wall 68.

In the upper "setting" position, there is a distance y between the bottom wall 68 of the flange 64 of slidable sleeve 62 and the top wall 56 of the skirt portion 54.

It is noted that the distance x is less than the distance y, the importance of which will be described later.

The sleeve member 62 is slidable around an upper portion of the pin member 32. It will also be appreciated that the outer diameter of the pin member 32 is slightly less than the inner diameter of the sleeve member 62 rendering the sleeve member 52 loosely and smoothly slidable along the pin member 32.

The top wall 66 of the sleeve flange 64 defines an annular planar support surface adapted to support the workpiece 16.

A plurality of bolts 70—70 and nuts 72—72 are employed to adjust the distance y between the bottom wall 68 of the sleeve flange 64 and the top wall 56 of the skirt portion 54. The enlarged heads 74—74 at each end of the bolts 70—70 are embedded into recesses provided on the top wall 66 of the sleeve flange 64. Threaded shank portions 76—76 at each other end of the bolts 70—70 are received in and slidable within apertures provided on the body flange portion 50.

FIG. 2 shows the Tee-nut in a first "ready" position. The Tee-nut 14 is held in the first "ready" position by holding means (not shown) in which the sleeve portion 18 is directly above and in alignment with the hole 22 in the workpiece 16 and the prongs 24—24 are pointing downwards perpendicular to the workpiece 16.

FIG. 3A shows the Tee-nut in a second "partially set" position.

In this "partially set" position, the Tee-nut 14 is partially set in the workpiece 16 by a downward force of the piston 12. In this position, the lower part of the threaded sleeve portion 18 of the Tee-nut 14 is inserted into the hole 22 of the workpiece 16 while the free end portions of the prongs 24—24 of the Tee-nut 14 are pierced into the upper surface 26 of the workpiece 16.

FIG. 3B shows the Tee-nut fully inserted in the workpiece, but before "forming" (described below).

FIG. 4 shows the Tee-nut in a finished "set and formed" position.

In operation, the workpiece 16 is placed horizontally on top of the Tee-nut setting and forming device 30 in such a position that the peripheral portion 38 of the hole 22 of the workpiece 16 is seated on the conical surface of the top end portion 34 of the pin member 32. The Tee-nut 14 will already have been transferred by the feed mechanism 13 to a position above the hole 22 of the workpiece 16 so that the Tee-nut 14 is in alignment with the hole 22. The piston 12, activated by a driving mechanism (not shown), exerts a downward axial force on the top surface of the flange head portion 15 of the Tee-nut. The Tee-nut 14 together with the workpiece 16 are first forced downwards until the lower surface 28 of the workpiece 16 abuts against the top support 66 of the sleeve flange 64. During this downward movement, only the pin member 32 is depressed because its conical surface is biased against the annular hole surface 38 of the workpiece 16 in the initial "ready" position.

Further downward movement of the piston (FIGS. 3A and 3B) progressively inserts the Tee-nut into the workpiece.

When the piston 12 continues to exert downward force (FIG. 4), both the pin member 32 and the sleeve flange 64 are depressed a distance of x until the bottom wall of the pin member 32 reaches the base or stop 48 of the cylindrical body 42. At this stage, the downward movement of the pin member 32 is stopped.

There is now a gap measuring a distance of y-x remaining between the bottom wall 68 of the sleeve flange 64 and the top wall 56 of the skirt portion 54. When the piston 12 exerts further downward force, the sleeve flange 64 alone, together with the workpiece 16, is forced downwards a distance of y-x against spring 60 while the pin member 32 remains stationary. Such depression finally causes the conical end portion 34 of the pin member 32 to be forced against and into the open lower end 20 of the Tee-nut 14, thereby flaring and forming the open lower end 20 radially outwards around the annular hole periphery 38 of the workpiece 16.

The Tee-nut 14 is now finally tightly both set and formed in the hole 22 in the workpiece 16.

Although illustrated as distinct stages, it will be understood that these setting and forming procedures are completed in a single operation by a single downward stroke of the piston 12.

The distance y-x the piston 12 travels at the end of each downward stroke is significant to the forming of the Tee-nut 14. As mentioned hereinbefore, the bolts 70—70 and the nuts 72—72 are employed to adjust the distance y, and hence the distance y-x, between the bottom wall 68 of the sleeve flange 64 and the top wall 56 of the skirt portion 54. A greater distance of y leads to a greater extent of flaring of the open lower end 20 of the Tee-nut 14.

FIG. 5 illustrates a second embodiment of Tee-nut setting and forming device.

This Tee-nut setting and forming device, generally represented by reference numeral 80, comprises a cylindrical body 82 having an annular flange portion 84 integrally provided at the upper end thereof. A pin member 86 is slidably received within the cylindrical body 82 and is biased at an upper normal position by means of a spring (not shown) within the lower portion of the cylindrical body 82.

The diameter of the pin member 86 is slightly less than the diameter of the inner surface of the cylindrical body 82 so that the pin member 86 is smoothly slidable within the body 82.

Provided on the pin member 86 is a conical top end portion 88 which defines a conical surface.

An annular resilient ring support member or buffer 90 is supported on the top wall of the annular flange portion 84 of the cylindrical body 82. The resilient ring member 90 is formed of rubber or plastic, such as polyurethane, to support the workpiece and functions in place of spring 60 and surface 66. The resilient ring member 90 is disposed generally concentrically around the pin member 86. The diameter of the central opening of the ring member 90 is larger than the diameter of the pin member 86 in such a manner that the pin member 86 can be slidable through the central opening of the ring member 90.

When a piston exerts a downward axial force on a Tee-nut located above a workpiece, similar to the first embodiment, the workpiece presses the pin member 86 downwards until the lower surface of the workpiece abuts against the top surface of the ring member 90. At this stage, only the pin member 86 is depressed.

Further downward movement of the piston drives the Tee-nut into the workpiece, without compression of ring 90.

When the piston continues to exert further downward force, the pin member 86 is further depressed, and the resilient ring member 90 is slightly compressed until the bottom wall of the pin member 86 reaches the base of the cylindrical body 82. At this stage, the downward movement of the pin member 86 is stopped. The resilient ring member 90 alone is further compressed while the pin member 86 remains stationary. Such compression causes the conical end portion 88 of the pin member 86 to be forced against and into the open lower end of the Tee-nut, thereby flaring and forming the open lower end of the Tee-nut radially outwards around an annular hole perimeter of the workpiece.

The Tee-nut is thus finally both set and formed in the hole in the workpiece.

The setting and forming of Tee-nuts according to this second embodiment can be adjusted by using ring members of different material and hardness.

When the open lower end 20 of the Tee-nut 14 is forced to flare out, it flares out evenly outwardly without causing any damage to the thread of the Tee-nut 14. In fact, this flaring out of the open lower end 20 of the Tee-nut 14 facilitates entry of a screw fastening (not shown) into the Tee-nut 14.

Thus it is not necessary to employ special Tee-nuts having the counter bore feature of earlier Tee-nuts.

As shown in FIG. 6, a protective cover 92 can be employed to cover the top surface of the resilient ring support member 90 and protect it from wearing. The cover 92 fits on top of the resilient ring member 90 and defines a rigid surface to resist the impact of the workpiece 16 on the resilient ring member 90.

FIG. 7 shows an enlarged detailed side view of the top end portion 34 of another embodiment of pin member 32. The top end portion 34 tapers into a first solid integral truncated conical portion 100 and a second solid integral truncated conical portion 102. A cylindrical solid integral head guide portion 104 is provided at the tapering end of the second conical portion 102 and extends upwardly to guide the Tee-nut onto the lower conical portions. The tapering surface of the first conical portion 100 is at an angle of 30° with the longitudinal axis of the pin member 32.

During operation, a continuous air flow is maintained through the air hose, up through the interior of the body. The air flows upwardly around the pin member, and prevents the accumulation of particles of wood or other material from workpiece 16, within the interior of the body.

Figure 8:
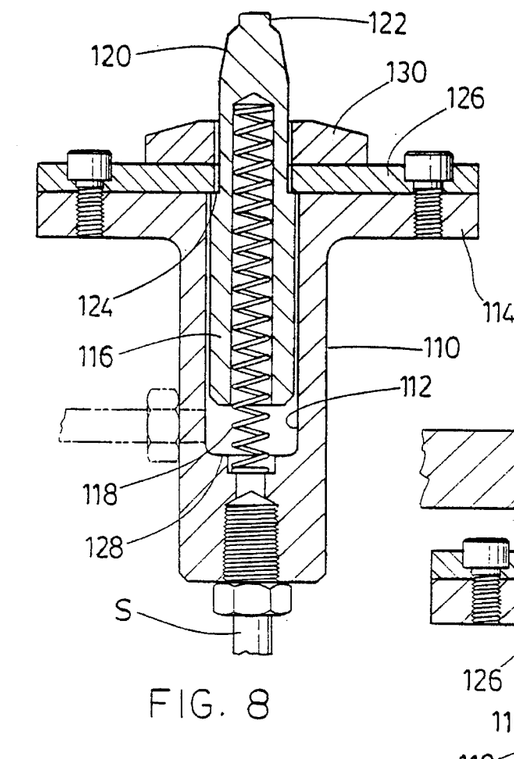
FIG. 8 is a sectional side elevational view of an alternate embodiment of the invention.
Figure 9:
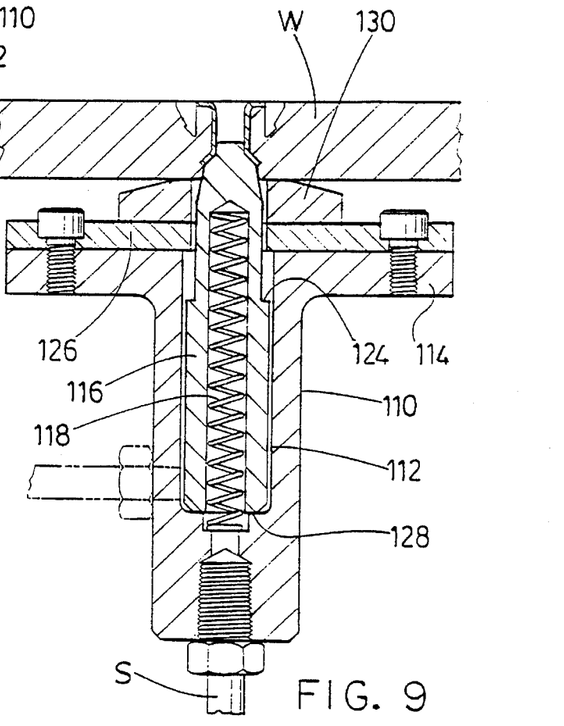
FIG. 9 corresponds to FIG. 8, in a lower, forming position.

Referring now to FIGS. 8 and 9, a further embodiment of the invention is illustrated. In this embodiment, a body 110 defines a cylindrical interior 112. An upper mounting flange 114 is providing the upper open end of the body 110. A die pin member 116 is loosely slidably received within the cylindrical interior of the body 110. A spring 118 urges the die pin 116 upwardly. The upper end of the die pin 116 is formed with a generally frusto-conical surface 120, and a generally cylindrical reduced diameter lead portion 122.

The die pin 116 is provided with a shoulder 124. A retaining plate 126 is secured to the flange 114 of the body. The flange has a central opening, having a reduced diameter relative to the body, and retains the die pin in position with the body. The lower end 128 of recess 112 forms a stop for the pin in 116. The die pin is shorter than the cylindrical recess in the body, and is thus reciprocable downwardly against the force of the spring and upwardly, being limited by the inter engagement of the retaining plate 126 and shoulder 124.

Figure 10:
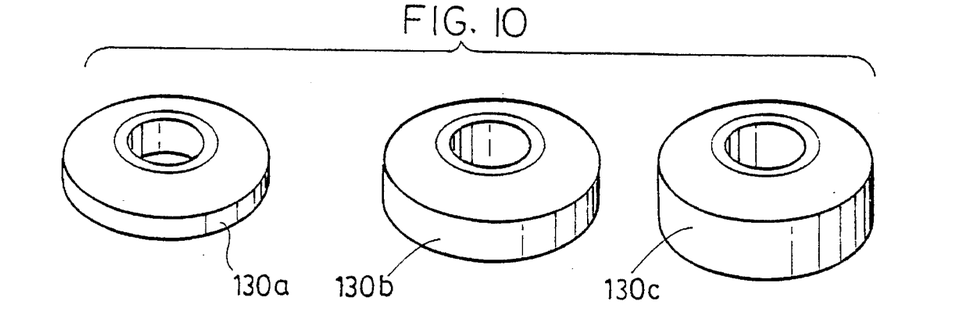
FIG. 10 is an illustration showing three buffer members, each having a different height, for use in association with the embodiment of FIGS. 8 and 9.

In order to accommodate workpieces W, and/or Tee-nuts, having varying dimensions, a plurality of buffer means in the form of spacer washers 130 are provided. Three such buffer means or washers 130a, 130b, and 130c are illustrated in FIG. 10. It will be observed that they are formed of varying heights. They all have central openings adapted to fit around the upwardly extending portion of the pin member. It will thus be apparent that by selecting a buffer or spacer member having an appropriate height, and placing it around the pin member, appropriate adjustments will be made so as to ensure that the Tee-nuts will be fully inserted into the workpiece, and that their open ends are flared outwardly, at the appropriate location in the workpiece.

Typically the buffer workers 130 are formed of metal such as steel.

In this way, it is possible to simplify the entire apparatus, and avoid the need for resilient two-stage operation of the apparatus of the embodiments of FIGS. 1 through 7. An air hose S connects with the lower end body 110 to supply air flow up through recess 112. Hoses S may optionally be connected to one side of body 110 as shown in phantom.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A machine for setting and forming a Tee-nut of the type having a threaded sleeve and an open lower end on said sleeve said machine being operable to set and form said Tee-nut in a hole in a workpiece having means for supporting the workpiece, and means for supplying the Tee-nut to the workpiece, and piston means operable to axially force the Tee-nut into the hole in the workpiece, said machine comprising:

a body defining a recess having an upper opening and means defining a stop;

a pin member having a lower end slidably received within said body;

a top end die portion defining a forming surface on the upper end of said pin member, said top end die portion defining a solid integral head portion shaped to fit within said lower end of said Tee-nut sleeve, and a solid integral flared conical portion flaring outwardly and downwardly from said head portion, operable to expand said lower end of said Tee-nut sleeve and wherein said flared portion of said pin member tapers successively into a first truncated conical portion and then into a second truncated conical portion and wherein the tapering surface of said first conical portion is at about a 30° angle relative to the longitudinal axis of said pin member;

a resilient pin movement means disposed within said body for urging said pin member in an upper normal position at a distance above and remote from said stop and being moveable into a lower setting position against said stop;

support means disposed around said pin member, said support means defining an upper planar surface for supporting the workpiece, whereby when said piston means forces said Tee-nut into said workpiece from one side thereof in one single stroke, said support means will support the workpiece while the Tee-nut is driven into the workpiece, said resilient pin movement means yielding until said pin member moves downwardly and reaches said stop, said solid integral top end die portion of said pin member being thereafter forced into said open lower end of said Tee-nut and said solid integral conical portion of said die portion, flaring and forming said open lower end of said Tee-nut radially outwards over a portion of said workpiece.

2. A machine for setting and forming Tee-nuts as claimed in claim 1, wherein said resilient pin movement means is a spring.

3. A machine for setting and forming Tee-nuts as claimed in claim 1, wherein said support means comprises:

a sleeve member adapted to be slidable towards and away from said body along an upper portion of said pin member;

an annular flange portion integrally provided at the upper end of said sleeve member and having a bottom wall, and, a spring mounted on said body for urging said annular flange portion into an upper normal position away from said body.

4. A machine for setting and forming Tee-nuts as claimed in claim 3, wherein the distance between the bottom wall of said pin member in its upper normal position and said body is less than the distance between the bottom wall of said annular flange portion and said body.

5. A machine for setting and forming Tee-nuts as claimed in claim 1, wherein said support means comprises an annular ring of resiliently compressible material having a predetermined hardness.

6. A machine for setting and forming Tee-nuts as claimed in claim 1, wherein said body and said pin member are generally cylindrical in shape and have common axes.

7. A machine for setting and forming Tee-nuts as claimed in claim 1 further comprises means adapted to be fitted on top of said support means in order to protect said support means from the impact of said workpiece.

8. A machine for setting and forming tee-nuts as claimed in claim 1, and including pin retaining means, on said body, for engaging and retaining said pin member, against upward movement of said pin member in response to said pin movement means.

9. A machine as claimed in claim 8 and wherein said retaining means comprising a shoulder formed on said pin member, and flange means on said body, said flange means defining an opening, having a diameter, such that the periphery of said flange means around said opening engages said shoulder, to retain said pin member in said body.

10. A machine as claimed in claim 8 and including at least two said support means, a first one of said support means having a predetermined first height, and a second one of said support means having a predetermined second height, greater than said first height.

11. A machine as claimed in claim 10 and wherein said support means define openings therethrough adapted to receive said pin member therein, whereby a selected one of said support means may be placed around said pin member.

12. A machine as claimed in claim 1 wherein said solid integral head portion of said top end die portion is of generally cylindrical shape.

* * * * *